G. W. BOWEN.
GREASE OR LUBRICANT CUP.
APPLICATION FILED MAY 24, 1909.
941,849.  Patented Nov. 30, 1909.
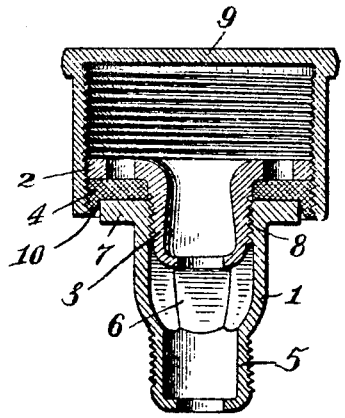
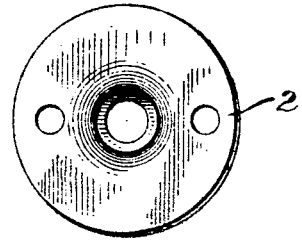
Witnesses:
Jas. E. Hutchinson
Chas. H. Young
Inventor:
George W. Bowen
By Parsons Hall & Bodell
Attorneys

UNITED STATES PATENT OFFICE.

GEORGE W. BOWEN, OF AUBURN, NEW YORK.

GREASE OR LUBRICANT CUP.

941,849.

Specification of Letters Patent.   Patented Nov. 30, 1909.

Application filed May 24, 1909.   Serial No. 497,856.

*To all whom it may concern:*

Be it known that I, GEORGE W. BOWEN, of Auburn, in the county of Cayuga and State of New York, have invented a new and useful Grease or Lubricant Cup, of which the following is a specification.

My invention relates to grease or lubricant cups and particularly to the construction of the bases thereof; and it consists in the combinations and constructions hereinafter set forth and claimed.

In describing this invention reference is had to the accompanying drawing in which like characters designate corresponding parts in all the views.

Figure 1 is a vertical sectional view of my lubricant cup. Figs. 2 and 3 are, respectively, a plan and a side elevation of one of the elements forming the base.

The grease or lubricant cup comprises, generally, a base and a cap. As here illustrated, the base comprises a hollow stem member 1, an element provided with the head 2 located above the stem member and spaced apart therefrom, and with an axial hollow nipple 3 extending into the stem member and secured thereto, and a packing disk 4 arranged between the upper side of the stem member and said head 2. The stem member 1 is threaded at its lower end 5 for securement to the bearing or other part to be lubricated, and is formed with a polysided part 6 near its upper end and with an annular outwardly-extending flange 7 at its upper end. Said stem member is also formed with internal threads 8 at its upper end. The head 2 is peripherally-threaded and the hollow nipple 3 is externally-threaded and turns into the threaded portion 8 of the stem member. Preferably said head 2 is of greater diameter than the flange 7 of the stem member.

The stem member and the element provided with the head 2 and nipple 3, are pressed from disks of sheet metal by the use of presses and dies, the disk from which said element is formed, having its central portion distorted in an axial direction in order to produce the nipple 3.

The packing disk 4 is of some flexible or fibrous material as leather, and is of a diameter the same as, or greater than, the head 2. The cap 9 which is usually pressed from sheet metal, is internally threaded, turns on the periphery of the head 2 and engages the margin of the packing disk 4 to form a tight joint between the base and cap when assembled. Providing the disk 4 is of greater diameter than the head 2, the cap 9 bends the margin of said disk as at 10 downwardly over the edge of the flange 7 of the stem member.

What I claim is:—

1. A lubricant cup comprising a base having a hollow stem member and an element provided with a head and an axial hollow nipple extending into the hollow stem member and secured thereto, and a cap engaging the periphery of the head of said element, substantially as and for the purpose described.

2. A lubricant cup comprising a base having a hollow stem member and an element provided with a head having a threaded periphery and an axial hollow nipple extending into the hollow stem member and secured thereto, and an internally-threaded cap turning on the periphery of the head of said element, substantially as and for the purpose specified.

3. A lubricant cup comprising a base having a hollow stem member internally threaded at its upper end and an element provided with a head having a threaded periphery and with an axial, externally-threaded hollow nipple fitting into the threaded portion of the stem member, and an internally-threaded cap turning on the periphery of the head of said element, substantially as and for the purpose set forth.

4. A lubricant cup comprising a base having a hollow stem member formed with an outwardly-extending flange at its upper end, an element provided with a head arranged above the flange of the stem member, and with an axial hollow nipple extending into the hollow stem member and secured thereto and a packing disk interposed between the flange of the stem member and the head of said element, and a cap engaging the periphery of the head of said element and the edge of said disk, substantially as and for the purpose described.

5. A lubricant cup comprising a base having a hollow stem member formed with an outwardly-extending flange at its upper end, an element provided with a peripherally-threaded head arranged above the flange of the stem member, and with an axial hollow nipple extending into the hollow stem member and secured thereto and a packing disk interposed between the flange of the stem member and the head of said element, and an internally-threaded cap turning on the head of said element and engaging the edge of the packing disk, substantially as and for the purpose specified.

6. A lubricant cup comprising a base having a hollow stem member formed with an outwardly-extending flange at its upper end and with internal threads at its upper end, an element provided with a peripherally-threaded head arranged above the flange of the stem member, and with an axial, externally-threaded hollow nipple fitting into the threaded portion of the stem member and a packing disk interposed between the flange of the stem member and the head of said element, and an internally-threaded cap turning on the head of said element and engaging the edge of said packing disk, substantially as and for the purpose set forth.

7. A lubricant cup comprising a base having a hollow stem member and an element provided with a head and an axial nipple extending into the hollow stem member and secured thereto, said element being of sheet metal and having the nipple depressed from and integral with the axial portion of the head thereof, and a cap engaging the periphery of the head of said element, substantially as and for the purpose described.

8. A lubricant cup comprising a base having a hollow stem member formed with internal threads at its upper end and an element provided with a peripherally-threaded head and with an axial, externally-threaded hollow nipple fitting into the threaded portion of the stem member, said element being of sheet metal and having the nipple depressed from and integral with the axial portion of the head thereof, and an internally-threaded cap turning on the head of said element, substantially as and for the purpose specified.

9. A lubricant cup comprising a base having a hollow stem member formed with an outwardly-extending flange at its upper end, an element secured to the stem member and provided with a peripherally-threaded head arranged above and spaced apart from the flange of the stem member, the head being of greater diameter than the flange of the stem member, and a packing disk of greater diameter than the head of said element, interposed between said head and flange and an internally-threaded cap turning on the head and engaging the margin of the packing disk and bending the same over the edge of the flange of the stem member, substantially as and for the purpose set forth.

10. A lubricant cup comprising a base having a hollow stem member formed with an outwardly-extending flange at its upper end and with internal threads at its upper end, an element provided with a peripherally-threaded head arranged above and spaced apart from the flange of the stem member, the head being of greater diameter than said flange, said element being also provided with an axial, externally-threaded hollow nipple fitting into the threaded portion of the stem member, and a packing disk interposed between the flange of the stem member and the head of said element, the packing disk being of greater diameter than the head of said element, and an internally-threaded cap turning on the head of said element and engaging the edge portion of the packing disk and bending the same over the edge of the flange and the stem member, substantially as and for the purpose described.

In testimony whereof, I have hereunto signed my name in the presence of two attesting witnesses, at Auburn, in the county of Cayuga, in the State of New York, this 12th day of May, 1909.

GEORGE W. BOWEN.

Witnesses:
RALPH R. HEELER,
J. H. WIMBLE.